United States Patent
Sumi et al.

(10) Patent No.: US 8,488,918 B2
(45) Date of Patent: Jul. 16, 2013

(54) SEMICONDUCTOR OPTICAL DEVICE, OPTICAL TRANSMITTER MODULE, OPTICAL TRANSCEIVER MODULE, AND OPTICAL TRANSMISSION EQUIPMENT

(75) Inventors: Seiji Sumi, Yokohama (JP); Shigenori Hayakawa, Atsugi (JP); Kaoru Okamoto, Yokohama (JP); Shunya Yamauchi, Yokohama (JP); Yasushi Sakuma, Tokyo (JP)

(73) Assignee: Oclaro Japan, Inc., Kanagawa (JP)

( * ) Notice: Subject to any disclaimer, the term of this patent is extended or adjusted under 35 U.S.C. 154(b) by 74 days.

(21) Appl. No.: 13/108,176

(22) Filed: May 16, 2011

(65) Prior Publication Data

US 2012/0008895 A1 Jan. 12, 2012

(30) Foreign Application Priority Data

Jul. 7, 2010 (JP) ................................ 2010-155186

(51) Int. Cl.
*G02F 1/035* (2006.01)
(52) U.S. Cl.
USPC .............................................. 385/2; 257/618
(58) Field of Classification Search
USPC .............................................. 385/2; 257/618
See application file for complete search history.

(56) References Cited

U.S. PATENT DOCUMENTS

| 6,335,559 | B1 * | 1/2002 | Charles .......................... 257/620 |
| 2003/0067010 | A1 * | 4/2003 | Iga et al. ........................ 257/103 |
| 2004/0179569 | A1 | 9/2004 | Sato et al. |
| 2006/0140554 | A1 * | 6/2006 | Oki ................................. 385/92 |

FOREIGN PATENT DOCUMENTS

JP 2004-273993 A 9/2004

* cited by examiner

*Primary Examiner* — Charlie Peng
*Assistant Examiner* — Peter Radkowski
(74) *Attorney, Agent, or Firm* — Mattingly & Malur, PC

(57) ABSTRACT

Provided is a semiconductor optical device, which has a buried heterostructure structure and is formed in a structure capable of reducing a parasitic capacitance to further improve characteristics thereof, and also provided are an optical transmitter module, an optical transceiver module, and an optical transmission equipment. The semiconductor optical device includes a modulator portion for modulating light input along an emitting direction and radiating the modulated light, the modulator portion including: a mesa-stripe structure, which includes an active layer and extends in the emitting direction; and a buried layer provided adjacent to each side of the mesa-stripe structure, in which a distance between a lower surface of the buried layer and a lower surface of the active layer is 20% or more of a distance between the lower surface and an upper surface of the buried layer.

19 Claims, 6 Drawing Sheets

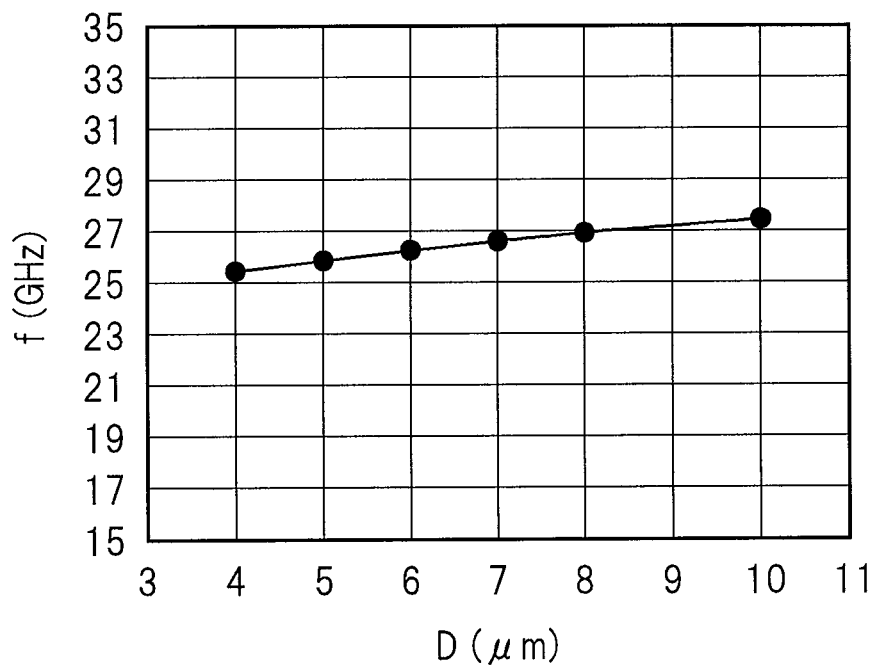

SEMICONDUCTOR OPTICAL DEVICE, OPTICAL TRANSMITTER MODULE, OPTICAL TRANSCEIVER MODULE, AND OPTICAL TRANSMISSION EQUIPMENT

CROSS-REFERENCE TO RELATED APPLICATION

The present application claims priority from Japanese patent application JP 2010-155186 filed on Jul. 7, 2010, the content of which is hereby incorporated by reference into this application.

BACKGROUND OF THE INVENTION

1. Field of the Invention

The present invention relates to a semiconductor optical device, an optical transmitter module, an optical transceiver module, and an optical transmission equipment. In particular, the present invention relates to improvement of characteristics of a semiconductor optical device including a modulator having a buried heterostructure.

2. Description of the Related Art

In recent years, along with the widespread use of the Internet, there have been demands for higher performance in speed and capacity of semiconductor optical devices, optical transceiver modules, and optical transmission equipments, which are used in an optical communication system. For example, an electro-absorption modulator (hereinafter, referred to as EA modulator) is widely used because of its advantageous characteristics of small chirp (wavelength variation) at the time of modulation, large extinction ratio, the extinction ratio being a difference between an ON level and an OFF level of an optical signal, and wide bandwidth, and further, because the electro-absorption modulator is small in size and low in cost.

The EA modulator is a modulator for modulating light by selectively applying an electric field to an active region of the EA modulator, with the use of a quantum confinement Stark effect (hereinafter, referred to as QCSE). Here, the active region is a so-called single-quantum well (hereinafter, referred to as SQW) layer, or multiple-quantum well (hereinafter, referred to as MQW) layer. Hereinafter, in this specification, MQW is assumed to include SQW in addition to general MQW. Note that, QCSE refers to an effect in which an absorption edge of light in the MQW layer is shifted to the long-wavelength side when the electric field is applied to the MQW layer.

A semiconductor optical device including the EA modulator is, for example, a modulator-integrated semiconductor optical device including an EA modulator portion and an oscillator portion, which are monolithically-integrated on the same semiconductor substrate. Continuous light, which emits from the oscillator portion by drive current injection, is optically modulated by applying an electric signal to the EA modulator portion, thereby outputting signal light.

FIG. 5A is a top view of a modulator-integrated semiconductor optical device 101 according to a conventional technology. The modulator-integrated semiconductor optical device 101 includes a modulator portion 102 and an oscillator portion 103 with a P-type electrode 124, and a waveguide portion 104. As described above, the modulator portion 102 performs optical modulation of continuous light, which emits from the oscillator portion 103.

FIG. 5B is a cross-sectional view of the modulator portion 102 of the modulator-integrated semiconductor optical device 101 according to the conventional technology. The cross section of the modulator portion 102 illustrated in FIG. 5B corresponds to a cross section taken along the broken line VB-VB of FIG. 5A.

As main structures of a semiconductor optical device, there are a buried heterostructure (hereinafter, referred to as BH structure) and a ridge-waveguide structure. The modulator-integrated semiconductor optical device 101 has the BH structure. The BH structure refers to a structure in which both sides of a mesa-stripe structure of a multilayer structure including an active layer 111, the mesa-stripe structure being formed by removing regions on the outer sides of a waveguide region, are each buried with a semi-insulating semiconductor layer. An EA modulator-integrated semiconductor optical device, which integrates an EA modulator having a BH structure, is disclosed in JP 2004-273993A.

In the modulator portion 102 of the conventional technology, on an n-type substrate 110 formed over an n-type electrode 115, the active layer 111 including the MQW layer, a p-type clad layer 112, and a p-type contact layer 113 are laminated. Here, the active layer 111 is made of an undoped (without doping process) semiconductor (intrinsic semiconductor).

Outer sides of the waveguide region of the multilayer structure are removed down to a part of the n-type substrate 110, to thereby form a mesa-stripe structure. As described above, both sides of the mesa-stripe structure are each buried with a buried layer 116, which is made of a semi-insulating semiconductor doped with impurities such as iron (Fe). Compared with the ridge-waveguide structure, the BH structure has a stronger effect of light confinement in a lateral direction. Therefore, compared with the case of the ridge-waveguide structure, a far field pattern (FFP) of the BH structure is more circular, and hence there are advantages that a fiber coupling efficiency is high and excellent radiation performance may be achieved. Therefore, the BH structure is widely used.

A passivation film 117 in a predetermined shape is formed so as to cover the upper surface of the mesa-stripe structure and the upper surface of the buried layer 116 located on each side of the mesa-stripe structure. The passivation film 117 is not formed in a part of the upper surface of the mesa-stripe structure and in parts of regions which become inclined surfaces of the upper surface of the buried layer 116, and thus a through hole is formed.

On the upper side of the passivation film 117, a p-type electrode 114 in a predetermined shape is formed, and the p-type electrode 114 and the p-type contact layer 113, which is the uppermost layer of the mesa-stripe structure, are electrically connected to each other via the through hole.

Note that, the impurities added to the p-type clad layer 112 and the p-type contact layer 113 interdiffuse with the impurities added to the buried layer 116, and hence the impurities added to the p-type clad layer 112 and the p-type contact layer 113 are diffused into the buried layer 116.

SUMMARY OF THE INVENTION

Main characteristics of the EA modulator include extinction ratio, optical output, chirp characteristics, and bandwidth. The bandwidth is not only a parameter for determining until which frequency high-speed modulation is possible, but also a parameter which influences quality of an optical waveform at the time of optical modulation. Therefore, in order to improve the characteristics of the EA modulator, it is important to widen the bandwidth. One of the important factors to widen the bandwidth is reducing a parasitic capacitance of the EA modulator.

FIG. 5C is a view representing the parasitic capacitances of the modulator portion 102 of the modulator-integrated semiconductor optical device 101 in the conventional technology. FIG. 5C represents the parasitic capacitance of the modulator portion 102 illustrated in FIG. 5B. When the modulator portion 102 has a structure in which the intrinsic semiconductor layer is sandwiched between the p-type layer and the n-type layer, the parasitic capacitance is generated.

First, the active layer 111 is sandwiched between the p-type clad layer 112 and the n-type substrate 110, and hence in this region, there exists a parasitic capacitance $C_i$. Next, the buried layer 116 is sandwiched between the p-type electrode 114 and the n-type substrate 110, and hence also in this region, there exist parasitic capacitances.

The p-type electrode 114 has a shape as illustrated in FIG. 5A. The mesa-stripe structure extends in the lateral direction of FIG. 5A, and a part of the p-type electrode 114 covers the p-type contact layer 113, which is the uppermost layer of the mesa-stripe structure, and extends in the lateral direction of FIG. 5A. This portion of the p-type electrode 114 is referred to as an extension portion. The p-type electrode 114 includes the extension portion, a pad portion in a rectangular shape disposed on the upper side of FIG. 5A, and a connection portion connecting the pad portion and the extension portion.

Out of the parasitic capacitances existing across the buried layer 116, a parasitic capacitance generated between the n-type substrate 110 and the pad portion and the connection portion of the p-type electrode 114 is referred to as a parasitic capacitance $C_{pad}$. In order to reduce the parasitic capacitance $C_{pad}$, an insulating film 118 is formed between the pad portion of the p-type electrode 114 and the passivation film 117. The insulating film 118 is made of, for example, silicon dioxide ($SiO_2$). In order to reduce the parasitic capacitance $C_{pad}$, it is conceivable to reduce the area of the pad portion, which corresponds to the area of the electrode of the parasitic capacitance $C_{pad}$. However, the pad portion of the p-type electrode 114 is a region for connecting a conductive wire so as to supply a voltage to be applied to the p-type electrode 114, and it is required to ensure an area sufficient for electrical connection to the conductive wire.

Further, as illustrated in FIG. 5B, the extension portion of the p-type electrode 114 covers the p-type contact layer 113, and also extends to reach the inclined surfaces of the semiconductor buried layer 116 and parts of the upper surface of the semiconductor buried layer 116.

Further, as described above, in the buried layer 116, impurities are diffused from both sides of the p-type clad layer 112 and the p-type contact layer 113. Those regions are illustrated in FIG. 5C as impurity diffusion regions 120. The impurities diffused into the impurity diffusion regions 120 from the p-type clad layer 112 and the p-type contact layer 113 are p-type dopants. Each of the impurity diffusion regions 120 in the buried layer 116 acts as a kind of p-type semiconductor.

Therefore, a parasitic capacitance generated between the n-type substrate 110 and the impurity diffusion region 120 spreading on each side of the mesa-stripe structure is referred to as a parasitic capacitance $C_m$. Further, a parasitic capacitance obtained by subtracting the parasitic capacitance $C_m$ from a parasitic capacitance generated between the n-type substrate 110 and the part of the extension portion of the p-type electrode 114, which is formed on the part of the upper surface and the inclined surfaces of the semiconductor buried layer 116, is referred to as a parasitic capacitance $C_s$, which is provided on each side of the mesa-stripe structure.

Referring to the above description, a total parasitic capacitance $C_{total}$ included in the modulator portion 102 is approximated to $C_{total} = C_i + 2 \cdot C_m + 2 \cdot C_s + C_{pad}$.

Here, as described above, in order to widen the bandwidth, it is necessary to reduce the total parasitic capacitance $C_{total}$ included in the modulator portion 102. Generally, the capacitance is proportional to the area of the electrode, and is inversely proportional to a distance between the electrodes. Therefore, in order to reduce the capacitance, the area of the electrode may be reduced, or the distance between the electrodes may be increased.

The parasitic capacitance $C_i$ occupies a particularly large proportion of the total parasitic capacitance $C_{total}$. The parasitic capacitance $C_i$ may be reduced by increasing the layer thickness of the active layer 111, which is the intrinsic semiconductor, but the layer thickness of the active layer 111 is a parameter which greatly influences characteristics other than the bandwidth (for example, extinction ratio), and hence the layer thickness cannot be reduced while giving priority only to the bandwidth. Further, what influences capacitances such as the parasitic capacitance $C_i$, the parasitic capacitance $C_m$, and the parasitic capacitance $C_s$ is a modulator length, which is a length of the modulator portion 102 in the extending direction (lateral direction of FIG. 5A). Similarly, the modulator length greatly influences characteristics other than the bandwidth, and hence the modulator length cannot be shortened while giving priority only to the bandwidth.

Therefore, as a parameter which has small influence on other characteristics, it is conceivable to increase a layer thickness D of the buried layer 116. As cases to increase the layer thickness D of the buried layer 116, the following three cases may be conceived.

The first case is the case where the height of the mesa-stripe structure, that is, the distance between the lower surface of the buried layer 116 and the upper surface of the p-type contact layer 113 is increased. In this case, by increasing the layer thickness D of the buried layer 116, the parasitic capacitance $C_{pad}$ and the parasitic capacitance $C_s$ are reduced. However, at the same time, the layer thickness of the p-type clad layer 112 (or the p-type contact layer 113) is increased, which results in that impurities further diffuse into the buried layer 116 from the p-type clad layer 112 and the p-type contact layer 113. In other words, along with the increase of the length of each of the impurity diffusion regions 120 illustrated in FIG. 5C in the vertical direction of FIG. 5C, the length of each of the impurity diffusion regions 120 in the lateral direction of FIG. 5C is also increased, which leads to an increase in the parasitic capacitance $C_m$.

The next case is the case where the height of the mesa-stripe structure is not changed, but the buried layer 116 is laminated further above the upper surface of the mesa-stripe structure. In this case, the height of the mesa-stripe structure is not changed, and hence even if the layer thickness D of the buried layer 116 is increased, the impurity diffusion regions 120 do not additionally expand, and hence the increase of the parasitic capacitance $C_m$ is suppressed. Here, for example, a case is considered where the n-type substrate 110 is made of n-type InP and the buried layer 116 is made of InP doped with impurities. In a case where crystal growth of the buried layer 116 is further performed to be higher than the upper surface of the mesa-stripe structure, the crystal growth of the buried layer 116 is performed along the plane direction of the (111) plane of InP, that is, at an angle of about 55 degrees with respect to the (100) plane direction (vertical direction in FIG. 5C) of the upper surface of the mesa-stripe structure. Therefore, as the layer thickness D of the buried layer 116 increases, in each of the parasitic capacitance $C_{pad}$ and the parasitic capacitance $C_s$, the length corresponding to the distance between the electrodes of the capacitor increases, which results in reduction of the parasitic capacitance $C_{pad}$ and the parasitic capacitance $C_s$. However, at the same time, the areas of the inclined surfaces of the buried layer 116 increase, and the width of the extension portion of the p-type electrode 114 (hereinafter, referred to as p-type electrode width) also increases. With this, in the parasitic capacitance $C_s$, the area corresponding to the electrode of the capacitor also increases, which causes increase of the parasitic capacitance $C_s$.

The final case is the case where the above-mentioned two cases are combined. As described above, this case encompasses factors which lead to, when the height of the mesa-stripe structure is increased to increase the layer thickness D of the buried layer 116, increase of the parasitic capacitance $C_m$, and lead to, when a part of the buried layer 116 above the upper surface of the mesa-stripe structure is increased in height, increase of the parasitic capacitance $C_s$.

FIG. 6 is a graph illustrating a calculation result of a bandwidth f, which is calculated with respect to the layer thickness D of the buried layer 116, in the modulator-integrated semiconductor optical device according to the conventional technology.

Here, the n-type substrate 110 is formed of an n-type InP substrate. The active layer 111 is formed so that a lower InGaAsP light guide layer, an MQW layer, and an upper InGaAsP light guide layer are laminated in the stated order from the n-type substrate 110 side (lower side of FIG. 5B). In the MQW layer, well layers and barrier layers, which are both made of InGaAsP, are alternately laminated. Note that, strain is introduced in the well layers of the MQW layer. The p-type clad layer 112 is formed of a p-type InP layer, and the p-type contact layer 113 is formed of a p-type InGaAsP layer and a p-type InGaAs layer. As a p-type dopant, Zn of about $9 \times 10^{17}$ atom/cm$^3$ is added to the p-type InP layer forming the p-type clad layer 112, and Zn of about $2 \times 10^{18}$ atom/cm$^3$ and Zn of about $2 \times 10^{19}$ atom/cm$^3$ are respectively added to the p-type InGaAsP layer and the p-type InGaAs layer forming the p-type contact layer 113. Note that, it is general to use Zn as a p-type dopant. Further, the buried layer 116 is formed of an InP layer doped with Fe as an impurity. It is general to use Fe as an impurity to be added to the buried layer 116. However, strong interdiffusion occurs between Zn and Fe. Therefore, in this case, there is a strong tendency that Zn diffuses into the impurity diffusion regions 120.

Here, a distance d between the lower surface of the buried layer 116 and the lower surface of the active layer 111 (hereinafter, referred to as active layer height d) is set to 0.4 µm, the layer thickness of the active layer 111 is set to 0.35 µm, and a total thickness of the layer thickness of the p-type clad layer 112 and the layer thickness of the p-type contact layer 113 is set to 1.7 µm. Further, the modulator length is set to 100 µm, and the width of the mesa-stripe structure is set to 1.3 µm. The pad portion of the p-type electrode 114 has a square shape of 45 µm×45 µm.

Under the state in which the above-mentioned values are set constant, by increasing the height of the part of the buried layer 116 laminated above the upper surface of the mesa-stripe structure, the layer thickness D of the buried layer 116 is increased. In accordance with this, the areas of the inclined surfaces of the buried layer 116, which extend on both sides of the mesa-stripe structure, are increased, and the p-type electrode width is also increased.

For example, when the layer thickness D of the buried layer 116 is D=4.0 µm, the p-type electrode width is 7.7 µm. At this time, the bandwidth f, which is obtained by calculation, is f=25.4 GHz. Further, when the layer thickness D of the buried layer 116 is D=7.0 µm, the p-type electrode width extends to be 11.7 µm. At this time, the bandwidth f, which is obtained by calculation, is f=26.6 GHz. The modulator having those bandwidths f is insufficient as a modulator used at a transmission rate of, for example, 40 Gbps.

As illustrated in FIG. 6, although the bandwidth f with respect to the layer thickness D of the buried layer 116 monotonically increases, the increase amount is small. Therefore, in order to set the bandwidth f to exceed 40 GHz, the layer thickness D is required to be greatly increased. However, a longer growth time period is necessary to cause the buried layer 116 to perform crystal growth so as to be higher than the upper surface of the mesa-stripe structure. During this period, however, the impurities contained in the p-type clad layer 112 and the p-type contact layer 113 are further diffused into the buried layer 116. With this, not only the increase of the parasitic capacitance $C_m$ is caused, but also, when the modulator portion 102 is driven, an electrical field applied to the active layer 111 expands also to the impurity diffusion regions 120, which causes deterioration of the characteristics as the modulator. By increasing the layer thickness D of the buried layer 116, in addition to the crystal growth of the buried layer 116 illustrated in FIG. 5B, there is an increased possibility that abnormal growth occurs also in a region above the mesa-stripe structure. When abnormal growth occurs in the buried layer 116 above the mesa-stripe structure, the electrical field is not applied below that region. Therefore, in an optical path through which light input to the modulator portion 102 emits outside, an abnormal electrical field distribution is generated, which causes deterioration of the characteristics as the modulator such as deterioration in extinction characteristics, for example. Therefore, the layer thickness D of the buried layer 116 cannot be increased unlimitedly.

Further, in the calculation represented in FIG. 6, the active layer height d is set to d=0.4 µm. By removing regions of the semiconductor multilayer, which are the outer sides of the waveguide region, the mesa-stripe structure is formed. At this time, the semiconductor multilayer is removed (over etched) to be lower than the lower surface of the active layer 111 so that both sides of the active layer 111, which becomes the waveguide region, are sufficiently removed. In this manner, the mesa-stripe structure is provided with the active layer height d. The active layer height d is generally determined in view of accuracy in the step of removal or the like. As a result, the active layer height d is generally set to a value around d=0.4 µm In view of the above-mentioned problems, an object of the present invention is to provide a semiconductor optical device, which has a BH structure and is formed in a structure capable of reducing a parasitic capacitance to further improve characteristics thereof, and also to provide an optical transmitter module which includes the semiconductor optical device, an optical transceiver module which includes the semiconductor optical device, and an optical transmission equipment which includes the semiconductor optical device.

(1) In order to solve the above-mentioned problems, a semiconductor optical device according to the present invention includes a modulator portion for modulating light input along an emitting direction and radiating the modulated light, the modulator portion including: a mesa-stripe structure, which includes an active layer and extends in the emitting direction; and a buried layer provided adjacent to each side of the mesa-stripe structure, in which a distance between a lower surface of the buried layer and a lower surface of the active layer is 20% or more of a distance between the lower surface and an upper surface of the buried layer.

(2) In the semiconductor optical device as described in Item (1) of the present invention, the buried layer may be made of a semiconductor doped with one of iron and ruthenium as an impurity.

(3) In the semiconductor optical device as described in Item (1) of the present invention, the active layer may contain one of an InGaAsP based material and an InGaAlAs based material.

(4) In the semiconductor optical device as described in Item (1) of the present invention, the modulator portion may be one of an electro-absorption modulator and a Mach-Zehnder modulator.

(5) The semiconductor optical device as described in Item (1) of the present invention may further include an oscillator portion which is monolithically-integrated with the modulator portion, for outputting light to the modulator portion.

(6) In the semiconductor optical device as described in Item (5) of the present invention, the oscillator portion may be a distributed feedback semiconductor laser.

(7) A semiconductor optical device module according to the present invention may be a semiconductor optical device module including the semiconductor optical device described in any one of Items (1) to (6) of the present invention.

(8) An optical transmitter module or an optical transceiver module according to the present invention may be an optical transmitter module or an optical transceiver module including the semiconductor optical device module described in Item (7) of the present invention.

(9) An optical transmission equipment according to the present invention may be an optical transmission equipment including the optical transmitter module or the optical transceiver module described in Item (8) of the present invention.

According to the present invention, there are provided a semiconductor optical device, which has a BH structure and is formed in a structure capable of reducing a parasitic capacitance to further improve characteristics thereof, an optical transmitter module which includes the semiconductor optical device, an optical transceiver module which includes the semiconductor optical device, and an optical transmission equipment which includes the semiconductor optical device.

BRIEF DESCRIPTION OF THE DRAWINGS

In the accompanying drawings:

FIG. 6 is a graph illustrating a calculation result of a bandwidth f of the modulator portion, which is calculated with respect to a layer thickness D of a buried layer, in the modulator-integrated semiconductor optical device according to the conventional technology.

DETAILED DESCRIPTION OF THE INVENTION

Figure 1A:
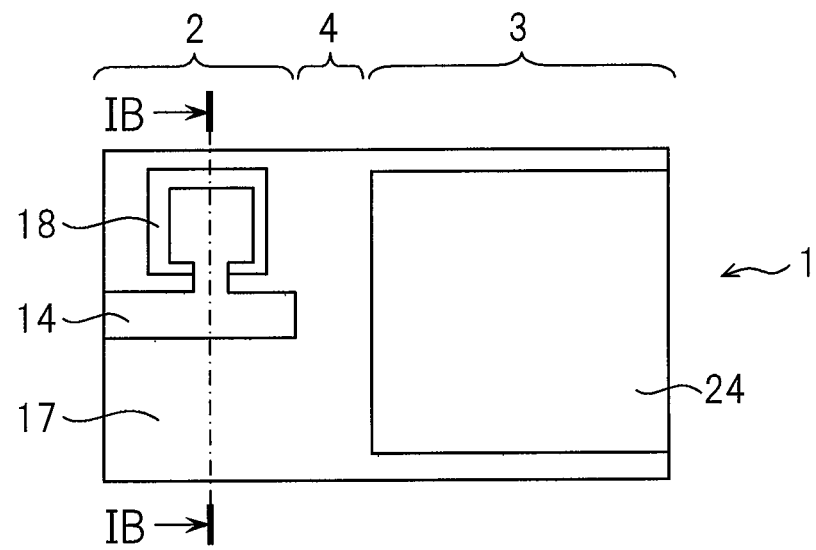
FIG. 1A is a top view of an EA modulator-integrated DFB laser device according to a first embodiment of the present invention.

Hereinafter, embodiments according to the present invention are described in detail. However, the drawings below are merely for description of examples of the respective embodiments, and the size illustrated in the drawings does not necessarily match with the scale size described in the examples.

First Embodiment

A semiconductor optical device according to a first embodiment of the present invention is a modulator-integrated semiconductor optical device including a modulator portion and an oscillator portion, which are monolithically-integrated on the same semiconductor substrate. Here, the modulator portion is an EA modulator, the oscillator portion is a distributed feedback semiconductor laser (distributed feedback laser: hereinafter, referred to as DFB laser), and the modulator-integrated semiconductor optical device is an EA modulator-integrated DFB laser device 1. The EA modulator-integrated DFB laser device 1 has a BH structure, and is used for optical transmission at a transmission rate of 40 Gbps in the 1.55-μm band.

FIG. 1A is a top view of the EA modulator-integrated DFB laser device 1 according to this embodiment. As described above, in the EA modulator-integrated DFB laser device 1, a modulator portion 2 formed of an EA modulator and an oscillator portion 3 formed of a DFB laser is integrated on a same n-type InP substrate 10. In a multilayer structure of the EA modulator-integrated DFB laser device 1, near a center thereof, there is a waveguide region extending in the lateral direction of FIG. 1A. The oscillated light transmits from the waveguide region of the oscillator portion 3 to the waveguide region of the modulator portion 2. Light is modulated by the modulator portion 2, and in accordance therewith, light emits as signal light from the left end of FIG. 1A.

As illustrated in FIG. 1A, a passivation film 17 is formed on the upper surface of the EA modulator-integrated DFB laser device 1. As described above, through holes (not shown) are formed in parts of the passivation film 17, which are regions in which the passivation film 17 is not formed. P-type electrodes 14 and 24 are formed in the modulator portion 2 and the oscillator portion 3, respectively, so as to cover the through holes. Further, an end surface from which light emits, which is on the left side of FIG. 1A, is covered with an antireflection film (not shown), and an end surface on the opposite side, which is on the right side of FIG. 1A, is covered with a high reflecting film (not shown). Note that, a modulator length, which is a length of the modulator portion 2 in the lateral direction of FIG. 1A, is 100 μm.

Figure 1B:
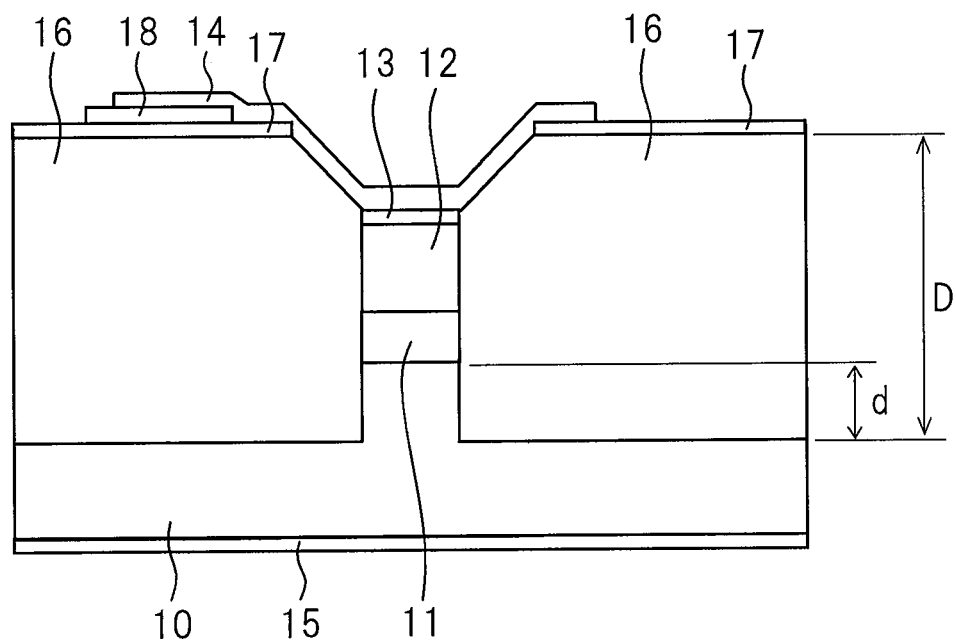
FIG. 1B is a cross-sectional view of a modulator portion of the EA modulator-integrated DFB laser device according to the first embodiment of the present invention.
Figure 5A:
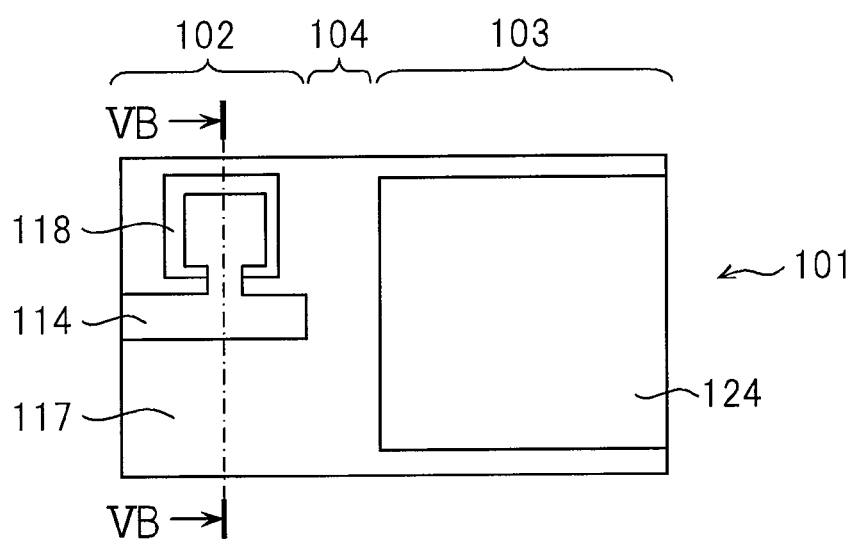
FIG. 5A is a top view of a modulator-integrated semiconductor optical device according to a conventional technology.
Figure 5B:
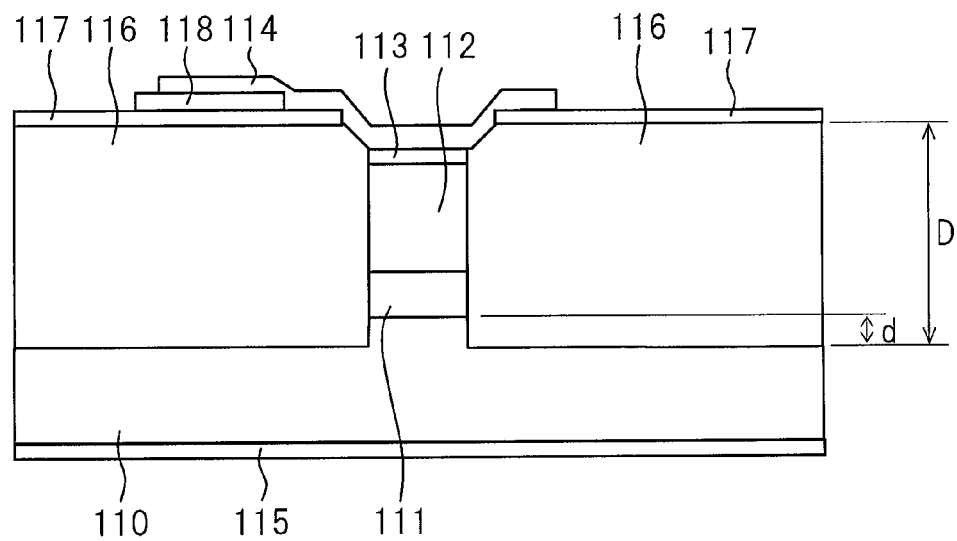
FIG. 5B is a cross-sectional view of a modulator portion of the modulator-integrated semiconductor optical device according to the conventional technology.
Figure 5C:
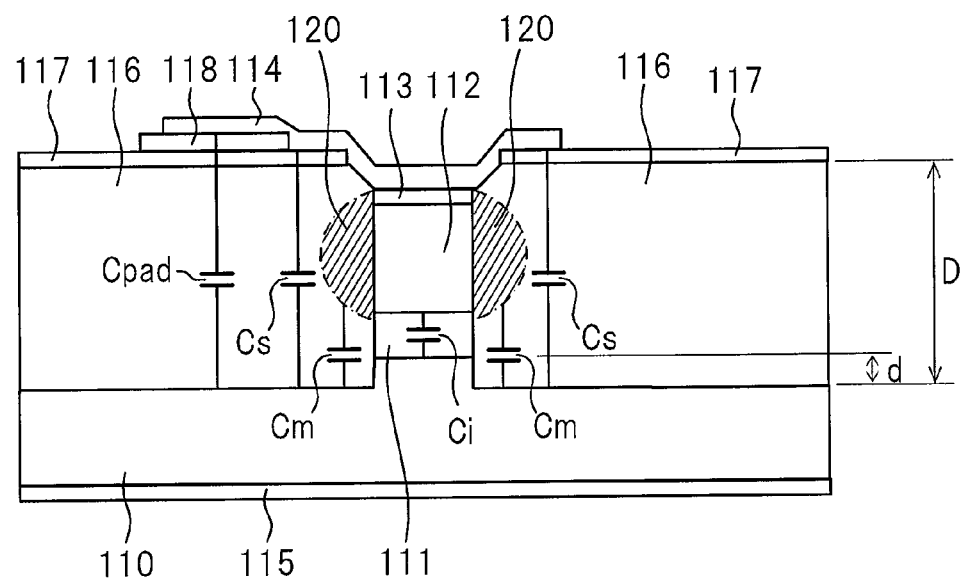
FIG. 5C is a view illustrating parasitic capacitances of the modulator portion of the modulator-integrated semiconductor optical device according to the conventional technology.

FIG. 1B is a cross-sectional view of the modulator portion 2 of the EA modulator-integrated DFB laser device 1 according to this embodiment. FIG. 1B illustrates a cross section taken along the broken line IB-IB in the EA modulator-integrated DFB laser device 1 illustrated in FIG. 1A. Similarly to the EA modulator according to the conventional technology illustrated in FIG. 5B, as illustrated in FIG. 1B, the modulator portion 2 of the EA modulator-integrated DFB laser device 1 according to this embodiment has a multilayer structure including an active layer 11, the multilayer structure being a mesa-stripe structure, and has a BH structure in which both sides of the mesa-stripe structure are buried with a buried layer 16. Note that, the oscillator portion 3 of the EA modulator-integrated DFB laser device 1 according to this embodiment similarly has the BH structure.

In a step of forming the mesa-stripe structure, in the modulator portion 2 of the EA modulator-integrated DFB laser device 1 according to this embodiment, outer sides of the waveguide region in the multilayer structure are subjected to dry etching to be removed deeper than the lower surface of the active layer 11. That is, the mesa-stripe structure is formed so that an active layer height d, which is a distance between the lower surface of the buried layer 16 and the lower surface of the active layer 11, is set to d=1.8 μm. Selecting d and D accordingly is the feature of the present invention.

In the modulator portion 2 of the EA modulator-integrated DFB laser device 1 according to this embodiment, the active layer 11 including a MQW layer, a p-type InP clad layer 12, and a p-type contact layer 13 are laminated on the n-type InP substrate 10. The active layer 11 includes at least the MQW layer, and represents a semiconductor layer intentionally undoped with impurities as a p-type dopant or an n-type dopant, that is, an intrinsic semiconductor layer, which differs from the p-type layer and the n-type layer respectively disposed on the upper and lower sides thereof. Here, the active layer 11 is formed so that a lower InGaAsP light guide layer, the MQW layer, and an upper InGaAsP light guide layer are laminated in the stated order from the n-type InP substrate 10 side (lower side of FIG. 1B). In the MQW layer, well layers and barrier layers, which are both made of InGaAsP, are alternately laminated. Note that, strain is introduced in the well layers of the MQW layer. The layer thickness of the active layer 11 is 0.35 μm. The p-type InP clad layer 12 is doped with Zn of about $9 \times 10^{17}$ atom/cm$^3$ as an impurity. The p-type contact layer 13 is formed of a p-type InGaAsP layer and a p-type InGaAs layer, which are respectively doped with Zn of about $2 \times 10^{18}$ atom/cm$^3$ and Zn of about $2 \times 10^{19}$ atom/cm$^3$ as a p-type dopant.

Both the sides of the mesa-stripe structure are buried with the buried layer 16 made of InP doped with Fe as an impurity. InP doped with Fe is a semi-insulating semiconductor. As described above, when crystal growth of the buried layer 16 is further performed to be higher than the upper surface of the mesa-stripe structure, the crystal growth of the buried layer 16 is performed along the plane direction of the (111) plane so as to be extended and laminated on inclined surfaces. The upper surface of the buried layer 16 includes an upper surface inclined surface portion, which extends on each side of the upper surface of the mesa-stripe structure, and an upper surface flat portion, which extends in parallel to the n-type InP substrate 10 on each side of the upper surface inclined surface portions. A layer thickness D of the buried layer 16 represents, as illustrated in FIG. 1B, a distance between the upper surface flat portion of the buried layer 16 and the lower surface of the buried layer 16. The layer thickness D of the buried layer 16 is D=7.0 μm. Therefore, a ratio r (=d/D) of the active layer height d to the layer thickness D of the buried layer 16 is r=26%.

As described above, the passivation film 17 in a predetermined shape is formed so as to cover the upper surface of the mesa-stripe structure and the upper surface of the buried layer 16. The p-type electrode 14 in a shape as illustrated in FIG. 1A is formed on the upper side of the passivation film 17. The p-type electrode 14 and the p-type contact layer 13, which is the uppermost layer of the mesa-stripe structure, are electrically connected to each other via the through hole described above. The p-type electrode 14 includes, as described above, an extension portion, a pad portion, and a connection portion. The p-type electrode width of the p-type electrode 14 is 9.7 μm. Note that, the pad portion of the p-type electrode 14 has a square shape of 45 μm×45 μm. An insulating film 18 made of SiO$_2$ is formed between the pad portion of the p-type electrode 14 and the passivation film 17 so as to reduce the parasitic capacitance $C_{pad}$.

Based on the above-mentioned values, the bandwidth f of the modulator portion 2 of the EA modulator-integrated DFB laser device 1 was calculated. As a result, a value of f=40.8 GHz was obtained. This is a value which can be used for optical transmission at a transmission rate of 40 Gbps. Further, an actually manufactured EA modulator-integrated DFB laser device 1 was mounted on a sub-mount, which is made of aluminum nitride (AlN) and has a termination resistor of 50Ω, with the use of AuSn solder. Characteristic evaluation was performed on this sub-mount using a fixture having a temperature adjustment function. As a result, the bandwidth f was f=42 GHz, and characteristics similar to the calculation result were obtained. Further, during drive at a transmission rate of 40 Gbps, a mask margin with respect to a mask which is specified by SONET OC-192/SDH STM-64, which represents eye pattern quality before optical transmission, is 25%. This is far above a basic value of 10%. Therefore, during drive at a transmission rate of 40 Gbps, a good eye pattern may be obtained.

The EA modulator-integrated DFB laser device 1 has the ratio r of r=26%, but bandwidths f with respect to different values of r were calculated.

Figure 2A:
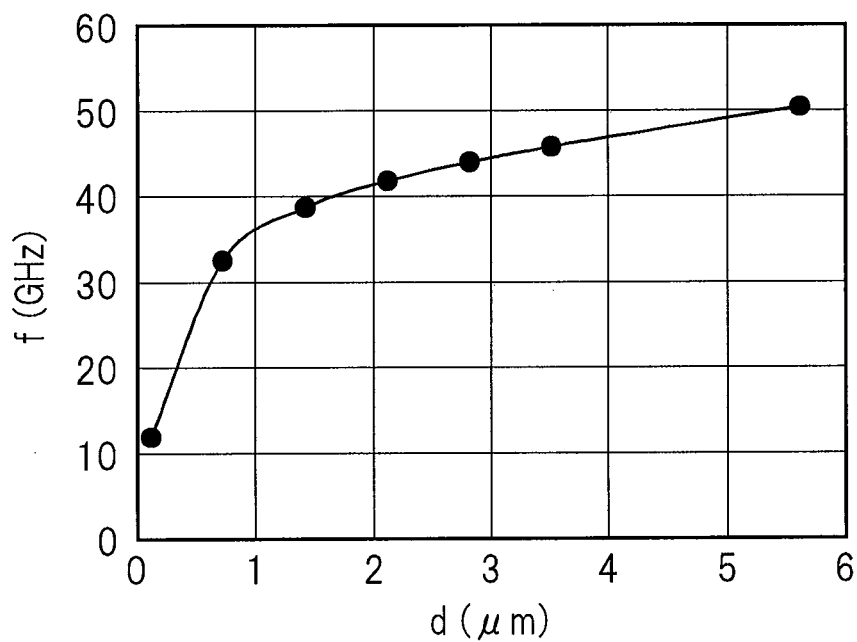
FIG. 2A is a graph illustrating a calculation result of a bandwidth f of the modulator portion, which is calculated with respect to an active layer height d, in the EA modulator-integrated DFB laser device according to the first embodiment of the present invention.
Figure 2B:
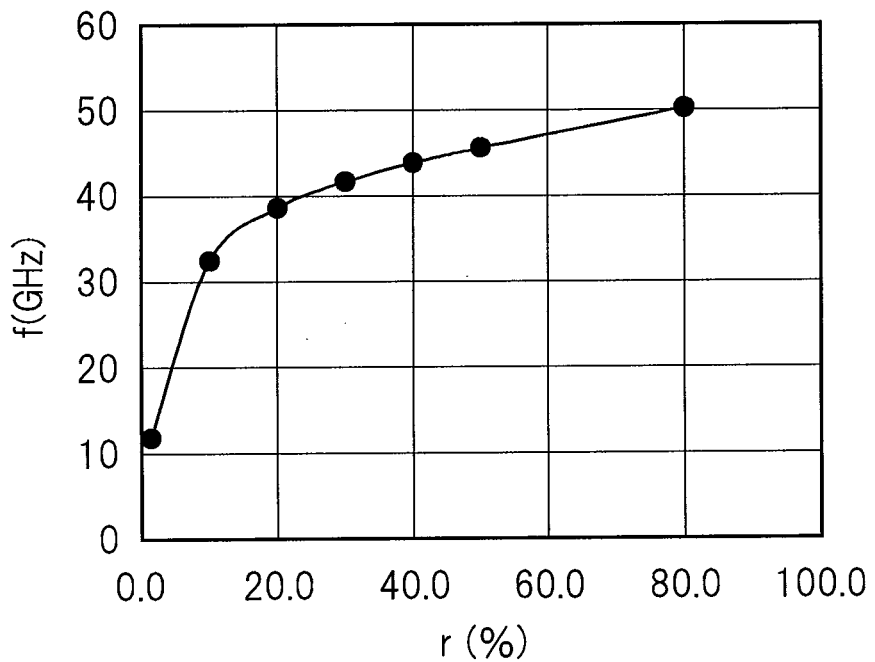
FIG. 2B is a graph illustrating a calculation result of the bandwidth f of the modulator portion, which is calculated with respect to a ratio r of the active layer height d to a layer thickness D of a buried layer, in the EA modulator-integrated DFB laser device according to the first embodiment of the present invention.

FIGS. 2A and 2B are graphs illustrating calculation results of the bandwidths f calculated with respect to the active layer height d and with respect to the ratio r of the active layer height d to the layer thickness D of the buried layer 16, respectively, in the EA modulator-integrated DFB laser device 1 according to this embodiment. Here, the layer thickness D of the buried layer 16 is fixed to D=7.0 μm, and the active layer height d is changed. Therefore, the ratio r changes in accordance with the change of the active layer height d. Note that, when the active layer height d increases, the thickness of the part of the buried layer 16 above the mesa-stripe structure is reduced, to thereby maintain the layer thickness D of the buried layer 16 constant.

As illustrated in FIGS. 2A and 2B, as the active layer height d (ratio r) increases, the bandwidth f is improved. In particular, when the ratio r increases from a small value to 20%, the bandwidth f sharply improves. In particular, in the EA modulator-integrated DFB laser device 1 with the ratio r of 20% or more, the bandwidth f takes a value larger than 40 GHz.

As described above, in the modulator portion 2 of the EA modulator-integrated DFB laser device 1 with the ratio r of the active layer height d to the layer thickness D of the buried layer 16 being 20% or more, characteristics are further improved.

As described above, the feature of the present invention resides in that, in the semiconductor optical device including the modulator portion having the BH structure, the active layer height d is 20% or more of the layer thickness D of the buried layer 16. In this manner, increase of the p-type layer formed in the multilayer structure of the mesa-stripe structure is suppressed, and increase of the parasitic capacitance $C_s$ is suppressed. Further, increase in area of the upper surface inclined portion of the buried layer 16 is suppressed, to thereby enable reduction of the parasitic capacitances $C_{pad}$ and $C_s$. In this manner, it is possible to reduce the total parasitic capacitance $C_{total}$ included in the modulator portion of the semiconductor optical device. With this, a semiconductor device with further improved characteristics may be realized. For example, it is possible to realize long distance optical transmission at a high transmission rate of, for example, 40 Gbps.

Note that, when the active layer height d is increased, during the formation of the buried layer 16, there is a possibility that crystal growth is not performed near the lower surface of the buried layer 16 because the buried layer 16 is brought into intimate contact with the both sides of the mesa-stripe structure. In that case, voids are formed at both the sides of the mesa-stripe structure, and hence the characteristics and the reliability of the EA modulator-integrated DFB laser device 1 are deteriorated. Therefore, the active layer height d is more desired to be 2.5 μm or smaller.

The active layer 11 of the modulator portion 2 of the EA modulator-integrated DFB laser device 1 according to this embodiment is made of an InGaAsP based material, but alternatively may be made of an InGaAlAs based material.

Next, a manufacturing method of the EA modulator-integrated DFB laser device 1 according to this embodiment is described.

First, a multilayer which becomes a part of the multilayer structure of the oscillator portion 3 is formed (first crystal growth). That is, on the n-type InP substrate 10, the active layer, a p-type InP cap layer, and a diffraction grating layer are formed in the stated order by metal-organic chemical vapor deposition (hereinafter, referred to as MO-CVD). Here, the active layer is formed by laminating the lower InGaAsP light guide layer, the MQW layer, and the upper InGaAsP light guide layer in the stated order. The MQW layer is formed by alternately laminating the well layers and the barrier layers, which are both made of InGaAsP. Note that, strain is introduced in the well layers of the MQW layer. At this time, the composition of InGaAsP of the MQW layer is adjusted so that the active layer of the oscillator portion 3 has a photoluminescence wavelength near 1,555 nm.

Then, by plasma chemical vapor deposition (hereinafter, referred to as plasma CVD), a silicon nitride (SiN) film is formed. After that, the SiN film in a region for the mesa-stripe structure of the oscillator portion 3 is patterned. With the use of this patterned SiN film as a mask, a region other than a predetermined region including the region for the mesa-stripe structure of the oscillator portion 3 is removed by dry etching and wet etching.

Next, a multilayer which becomes a part of the multilayer structure of the modulator portion 2 is formed (second crystal growth). Similarly to the oscillator portion 3, on the n-type InP substrate 10, the active layer 11 and the p-type InP cap layer are formed by MO-CVD. At this time, the composition of InGaAsP of the MQW layer is adjusted so that the active layer 11 of the modulator portion 2 has a photoluminescence wavelength near 1,495 nm.

Then, the SiN film is formed by plasma CVD. After that, the SiN film in a region for the mesa-stripe structure of the modulator portion 2 is patterned. With the use of this patterned SiN film as a mask, a region other than a predetermined region including the region for the mesa-stripe structure of each of the modulator portion 2 and the oscillator portion 3 is removed by dry etching and wet etching.

Further, apart of a multilayer structure of a waveguide portion 4 is formed (third crystal growth). Similarly to the first crystal growth and the second crystal growth, an InGaAsP layer, which becomes a passive optical waveguide, is caused to perform crystal growth between the modulator portion 2 and the oscillator portion 3. At this time, optical connection is performed between the modulator portion 2 and the waveguide portion 4, and between the waveguide portion 4 and the oscillator portion 3 by a well-known butt joint technology.

After that, in the diffraction grating layer of the oscillator portion 3, a diffraction grating (grating) is formed by an interference exposure method. Further, after the diffraction grating is formed, on the upper surface of the multilayer of each of the modulator portion 2, the waveguide portion 4, and the oscillator portion 3, the p-type InP clad layer 12, the p-type contact layer 13, and the p-type InP cap layer are formed. Here, a total thickness of the layer thickness of the p-type InP clad layer 12 and the layer thickness of the p-type contact layer 13 is set to 1.7 μm, and as described above, an impurity of Zn is used as a p-type dopant. Note that, the p-type InP cap layer is removed in a later step, and hence the p-type InP cap layer does not remain is the final structure.

After the multilayer is formed, a $SiO_2$ film is formed in a region above the waveguide region in the upper surface of the multilayer of each of the modulator portion 2, the waveguide portion 4, and the oscillator portion 3. After that, a region other than the region where the $SiO_2$ is formed of the multilayer is removed down to the middle of the n-type InP substrate 10 by dry etching or wet etching. In this manner, a mesa-stripe structure having a width of 1.3 μm is formed. Here, by removing the n-type InP substrate 10 to be 1.8 μm below the lower surface of the active layer 11, a mesa-stripe structure having the active layer height d of 1.8 μm is formed.

After the mesa-stripe structure is formed, with respect to both sides of the mesa-stripe structure, the buried layer 16 made of InP doped with Fe as an impurity is formed by MO-CVD. At this time, the buried layer 16 is caused to perform crystal growth until the buried layer thickness D is 7.0 μm.

Further, a region of the waveguide portion 4 of the p-type contact layer 13, which is the uppermost layer of the mesa-stripe structure, is removed. With this, the p-type contact layer 13 of the modulator portion 2 and the p-type contact layer of the oscillator portion 3 are electrically insulated from each other. Therefore, a groove generated by the removal is called an isolation groove.

After the isolation groove is formed, on the entire surface of the wafer, the passivation film 17 is formed. Further, the insulating film 18 made of $SiO_2$ is formed in a region including a region for the pad portion of the p-type electrode 14 of the modulator portion. As described above, the parasitic capacitance $C_{pad}$ is reduced by the insulating film 18. After that, a part of each of the regions for the modulator portion 2 and the oscillator portion 3 of the formed passivation film 17 is removed by wet etching, to thereby form through holes. The p-type electrodes 14 and 24 of the modulator portion 2 and the oscillator portion 3 are respectively formed by electron beam (EB) evaporation method and ion milling so as to cover the respective through holes of the modulator portion 2 and the oscillator portion 3. FIG. 1A illustrates shapes of the p-type electrodes 14 and 24 respectively provided in the modulator portion 2 and the oscillator portion 3. As described above, the p-type electrode width of the p-type electrode 14 of the modulator portion 2 is 9.7 μm, and the pad portion of the p-type electrode 14 is formed in a 45 μm-square shape. Meanwhile, the DFB laser of the oscillator portion 3 does not receive much influence from the parasitic capacitance, and hence the p-type electrode 24 has a shape extending on both the sides of the mesa-stripe structure.

After that, the lower surface of the wafer is processed by polishing until the wafer thickness is reduced to about 100 µm. Then, an n-type electrode 15 is formed, to thereby complete a wafer step. Further, the wafer is cleaved in a bar shape. Then, an antireflection film is formed on the end surface on the modulator portion 2 side, and a high reflecting film is formed on the end surface of the oscillator portion 3 side. Further, the wafer is cleaved in a chip state, to thereby complete the EA modulator-integrated DFB laser device 1.

Second Embodiment

A semiconductor optical device according to a second embodiment of the present invention is, similarly to the first embodiment, an EA modulator-integrated DFB laser device 1 having a BE structure. The EA modulator-integrated DFB laser device 1 according to this embodiment has the same fundamental structure and is formed in the same manufacturing method as the EA modulator-integrated DFB laser device 1 according to the first embodiment, but the EA modulator-integrated DFB laser device 1 according to the second embodiment is used for optical transmission at a transmission rate of 25 Gbps in the 1.3-µm band.

Figure 3A:
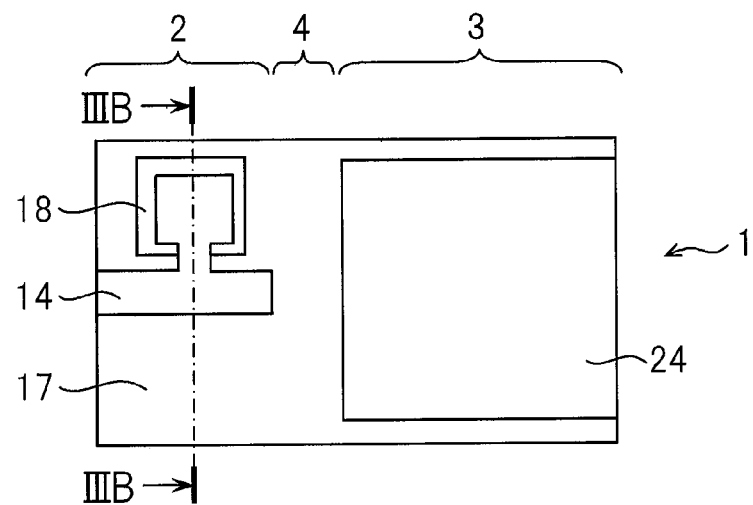
FIG. 3A is a top view of an EA modulator-integrated DFB laser device according to a second embodiment of the present invention.
Figure 3B:
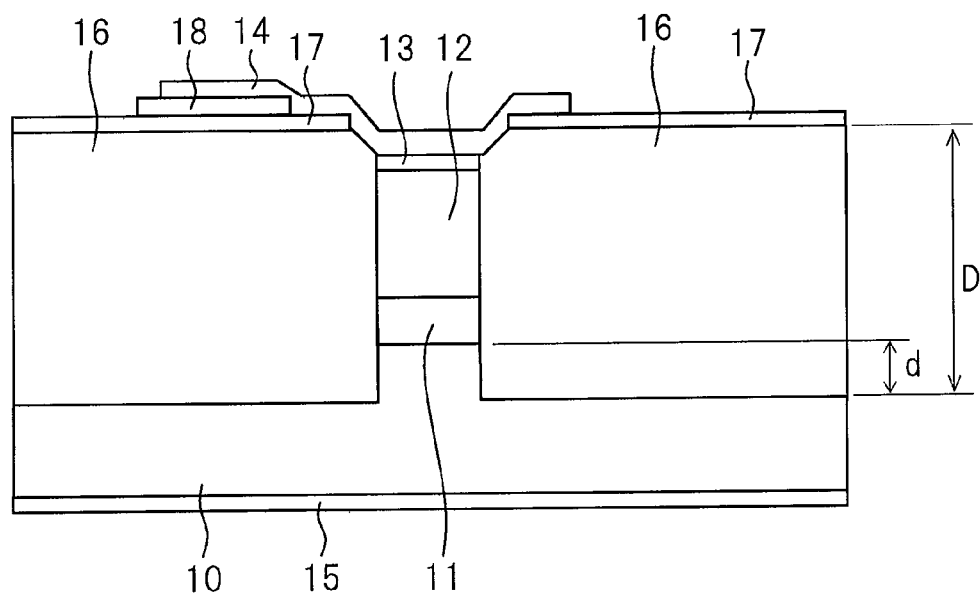
FIG. 3B is a cross-sectional view of a modulator portion of the EA modulator-integrated DFB laser device according to the second embodiment of the present invention.

FIG. 3A is a top view of the EA modulator-integrated DFB laser device 1 according to this embodiment. FIG. 3B is a cross-sectional view of the modulator portion 2 of the EA modulator-integrated DFB laser device 1 according to this embodiment. FIG. 3B illustrates a cross section taken along the broken line IIIB-IIIB in the EA modulator-integrated DFB laser device 1 illustrated in FIG. 3A. As illustrated in FIG. 3B, the EA modulator-integrated DFB laser device 1 similarly has the BH structure.

In the EA modulator-integrated DFB laser device 1 according to this embodiment, the active layer 11 of the modulator portion 2 is made of InGaAlAs. The layer thickness of the active layer 11 is 0.25 µm, and the active layer height d is d=1.0 µm. The layer thickness D of the buried layer 16 is 5.0 µm. At this time, the ratio r of the active layer height d to the layer thickness D of the buried layer 16 is r=20%. Further, the p-type electrode width of the p-type electrode 14 is 8.2 µm. The modulator length of the modulator portion 2 is 150 µm.

The EA modulator-integrated DFB laser device 1 according to this embodiment is used at the transmission rate of 25 Gbps, and is capable of being driven by a low bias voltage. For that purpose, the layer thickness of the active layer 11 is set smaller than that of the EA modulator-integrated DFB laser device 1 according to the first embodiment. Further, the transmission rate is 25 Gbps, which is lower compared with the transmission rate of 40 Gbps in the case of the EA modulator-integrated DFB laser device 1 according to the first embodiment. Therefore, the layer thickness D of the buried layer 16 can be set to 5.0 µm to obtain the desired characteristics.

Based on the above-mentioned values, the bandwidth f of the modulator portion 2 of the EA modulator-integrated DFB laser device 1 was calculated. As a result, a value of f=25.3 GHz was obtained. Further, similarly to the first embodiment, characteristic evaluation was performed on the actually manufactured EA modulator-integrated DFB laser device 1. As a result, the bandwidth f of the modulator portion 2 was f=26.5 GHz, and characteristics similar to the calculation result were obtained.

Note that, the active layer 11 of the EA modulator-integrated DFB laser device 1 according to this embodiment is made of an InGaAlAs based material, but alternatively may be made of an InGaAsP based material.

Third Embodiment

An optical transmitter module according to a third embodiment of the present invention is an optical transmitter module 40 on which the EA modulator-integrated DFB laser device 1 of the first embodiment or the second embodiment is mounted.

Figure 4:
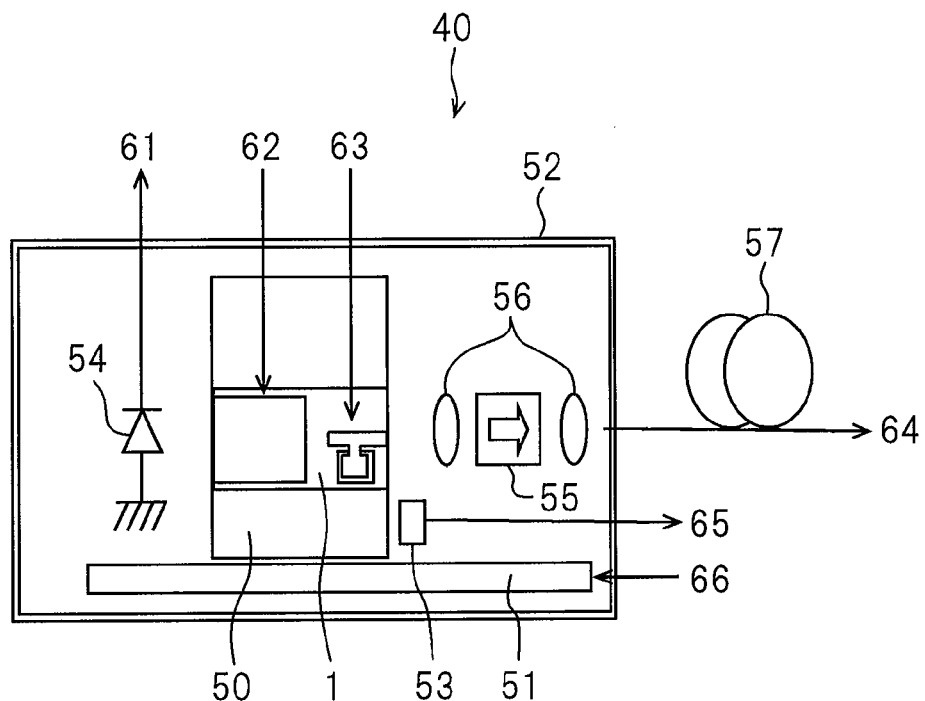
FIG. 4 is a diagram illustrating a structure of an optical transmitter module according to a third embodiment of the present invention.

FIG. 4 is a diagram illustrating a structure of the optical transmitter module 40 according to this embodiment. The EA modulator-integrated DFB laser device 1 according to the first embodiment or the second embodiment is mounted on a chip carrier 50, which is made of aluminum nitride (AlN) and has a termination resistor of 50Ω, with the use of AuSn solder. The chip carrier 50 is mounted on an upper side of a Peltier device 51, which is temperature adjustment means. The above-mentioned members are mounted in a package 52. A thermistor 53, a monitor photo diode 54, an optical isolator 55, and condensing lenses 56 are further mounted in the package 52. Here, the condensing lenses 56 are lenses for condensing light to a fiber 57 connected to the light emitting destination.

Outside the optical transmitter module 40 according to this embodiment, a control circuit (not shown) is provided. The control circuit performs auto power control (APC) with respect to the optical transmitter module 40. That is, the monitor photo diode 54 receives rear output light, which is output from the rear end surface of the EA modulator-integrated DFB laser device 1, to thereby output a monitor current 61 to the control circuit. In response to the monitor current 61, a laser drive current 62 is supplied to the oscillator portion 3 of the EA modulator-integrated DFB laser device 1. With the APC, it is possible to maintain constant the output power of output light 64 of the optical transmitter module 40. Note that, a modulator drive signal 63 is supplied to the modulator portion 2 of the EA modulator-integrated DFB laser device 1.

Further, by the control circuit, auto temperature control (ATC) is performed on the optical transmitter module 40. That is, the thermistor 53 detects the temperature of the EA modulator-integrated DFB laser device 1, and outputs the detected temperature as a monitor temperature 65 to the control circuit. In response to the monitor temperature 65, a Peltier device drive current 66 is supplied to the Peltier device 51. With the ATC, it is possible to maintain constant the temperature of the EA modulator-integrated DFB laser device 1.

Similarly, an optical transceiver module according to this embodiment is an optical transceiver module including an optical transmitter portion on which the EA modulator-integrated DFB laser device 1 of the first embodiment or the second embodiment is mounted, and a well-known optical receiver portion. The structure of the optical transmitter portion of the optical transceiver module is the same as the structure of the optical transmitter module 40.

Further, an optical transmission equipment according to this embodiment is an optical transmission equipment on which the optical transmitter module 40 or the optical transceiver module described above is mounted. Other structures of the optical transmission equipment are the same as those of well-known optical transmission equipments.

Note that, the package 52 is formed by processing a metal material to a box shape. The package 52 includes components such as a base plate made of a CuW alloy with a high thermal conductivity, a frame made of an FeNi alloy, a ceramic feedthrough on which a wiring pattern is formed for transmitting an electrical signal inside the package 52, a lead terminal, a seam ring for seam welding a cap, a sapphire glass for intimately sealing a window for extracting light, and a pipe member for fixing by welding a lens holder or an optical fiber. The package 52 is assembled using a bonding material such as a brazing material or AuSn solder.

In the above, description is made of the semiconductor optical device, the optical transmitter module, the optical transceiver module, and the optical transmission equipment according to the present invention. The present invention is provided for realizing reduction in parasitic capacitance existing in the semiconductor optical device. As the semiconductor optical device according to the embodiments, the EA modulator-integrated DFB laser device 1 is described as an example. Description is made of a case where Fe is used as the dopant of the buried layer 16, but ruthenium (Ru) may be alternatively used as a dopant. Further, the structure of the modulator portion 2 is not limited to the EA modulator. For example, the structure of the modulator portion 2 may be other modulators such as a Mach-Zehnder modulator. The structure of the oscillator portion 3 is also not limited to the DFB laser. Further, the present invention is not limited to a modulator-integrated semiconductor optical device including the modulator portion 2 and the oscillator portion 3 integrated on the same semiconductor substrate, such as the EA modulator-integrated DFB laser device 1. The semiconductor optical device according to the present invention may be an external modulator, which is provided outside a laser device on an output side. Here, the external modulator is, for example, an EA modulator or a Mach-Zehnder modulator. Further, the semiconductor optical device according to the present invention is not limited to a modulator. It is possible to apply the present invention as a structure for reducing parasitic capacitances of other semiconductor optical devices having a BH structure.

While there have been described what are at present considered to be certain embodiments of the invention, it will be understood that various modifications may be made thereto, and it is intended that the appended claims cover all such modifications which fall within the true spirit and scope of the invention.

What is claimed is:

1. A semiconductor optical device, comprising a modulator portion for modulating light input along an emitting direction and radiating the modulated light,
    the modulator portion comprising:
        a mesa-stripe structure, which includes an active layer and extends in the emitting direction, where the active layer has a lower guide layer, a multiple quantum well (MQW) layer, and an upper light guide layer; and
        a buried layer disposed adjacent to each side of the mesa-stripe structure,
    wherein a distance between a lower surface of the buried layer and a lower surface of the active layer is at least 1 μm and also is 20% or more of a distance between the lower surface and an upper surface of the buried layer.

2. The semiconductor optical device according to claim 1, wherein the buried layer is made of a semiconductor doped with one of iron and ruthenium as an impurity.

3. The semiconductor optical device according to claim 1, wherein the active layer contains one of an InGaAsP based material and an InGaAlAs based material.

4. The semiconductor optical device according to claim 1, wherein the modulator portion comprises one of an electro-absorption modulator and a Mach-Zehnder modulator.

5. The semiconductor optical device according to claim 1, further comprising an oscillator portion which is monolithically-integrated with the modulator portion, for outputting light to the modulator portion.

6. The semiconductor optical device according to claim 5, wherein the oscillator portion comprises a distributed feedback semiconductor laser.

7. A semiconductor optical device module, comprising the semiconductor optical device according to claim 1.

8. An optical transmitter module, comprising the semiconductor optical device module according to claim 7.

9. An optical transceiver module, comprising the semiconductor optical device module according to claim 7.

10. An optical transmission equipment, comprising the optical transmitter module according to claim 8.

11. An optical transmission equipment, comprising the optical transceiver module according to claim 9.

12. The semiconductor optical device of claim 1, wherein the distance between the lower surface of the buried layer and the lower surface of the active layer is 1.8 μm.

13. A semiconductor optical device, comprising a modulator portion for modulating light input along an emitting direction and radiating the modulated light,
    the modulator portion comprising:
        a mesa-stripe structure, which includes an active layer and extends in the emitting direction, where the active layer has a lower light guide layer, a multiple quantum well (MQW) layer, and an upper light guide layer; and
        a buried layer disposed adjacent to each side of the mesa-stripe structure,
    wherein a distance between a lower surface of the buried layer and a lower surface of the active layer is greater than or equal to 1 μm and less than or equal to 5 μm, and also is 20% or more of a distance between the lower surface and an upper surface of the buried layer.

14. The semiconductor optical device according to claim 13, wherein the buried layer is made of a semiconductor doped with one of iron and ruthenium as an impurity.

15. The semiconductor optical device according to claim 13, wherein the active layer contains one of an InGaAsP based material and an InGaAlAs based material.

16. The semiconductor optical device according to claim 13, wherein the modulator portion comprises one of an electro-absorption modulator and a Mach-Zehnder modulator.

17. The semiconductor optical device according to claim 13, further comprising an oscillator portion which is monolithically-integrated with the modulator portion, for outputting light to the modulator portion.

18. The semiconductor optical device according to claim 17, wherein the oscillator portion comprises a distributed feedback semiconductor laser.

19. The semiconductor optical device of claim 13, wherein the distance between the lower surface of the buried layer and the lower surface of the active layer is 1.8 μm.

* * * * *